US011073074B1

(12) United States Patent
Kennedy et al.

(10) Patent No.: US 11,073,074 B1
(45) Date of Patent: Jul. 27, 2021

(54) CHARGE AIR COOLER FAN CONTROL

(71) Applicant: Deere & Company, Moline, IL (US)

(72) Inventors: Thomas L. Kennedy, Dubuque, IA (US); Steven R. Sass, Dubuque, IA (US); Mark Ritter, East Dubuque, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/854,006

(22) Filed: Apr. 21, 2020

(51) Int. Cl.
*F02B 29/04* (2006.01)
*F01P 7/02* (2006.01)
*B01D 46/00* (2006.01)

(52) U.S. Cl.
CPC ...... *F02B 29/0406* (2013.01); *B01D 46/0057* (2013.01); *B01D 46/0067* (2013.01); *F01P 7/026* (2013.01); *F02B 29/0431* (2013.01)

(58) Field of Classification Search
CPC .............. F02B 29/0406; F02B 29/0431; F02B 29/0475; F02B 29/0493; F01P 7/026; F01P 7/046; F01P 7/048; F01P 7/06; B01D 46/0057; B01D 46/0067; B01D 46/0068; B01D 46/0083
See application file for complete search history.

(56) References Cited

U.S. PATENT DOCUMENTS

| 9,506,430 B2 | 11/2016 | Smith et al. |
| 9,664,104 B2 | 5/2017 | Glugla et al. |
| 10,352,229 B2 | 7/2019 | Singh et al. |
| 2013/0153180 A1* | 6/2013 | Montocchio ........... B60K 11/04 165/121 |
| 2016/0047609 A1* | 2/2016 | Gauthier ................. F28G 13/00 165/303 |

* cited by examiner

*Primary Examiner* — Jacob M Amick

(57) ABSTRACT

A work vehicle includes an engine, a compressor used to compress an air toward the engine, a charge air cooler, a sensor, and a control unit. The charge air cooler comprising or coupled to a fan. The fan can rotate in a first direction to remove a heat of the air and to rotate in a second direction reverse to the first direction so as to blow a debris. The control unit is electrically coupled to the engine and to the fan. The control unit predicts whether a temperature of the air exceeds a threshold based on a signal received from the sensor. When the temperature of the air is below the threshold, the fan can rotate in the second direction. When the temperature of the air is equal to or above the threshold, the fan is inhibited from rotating in the second direction.

12 Claims, 5 Drawing Sheets

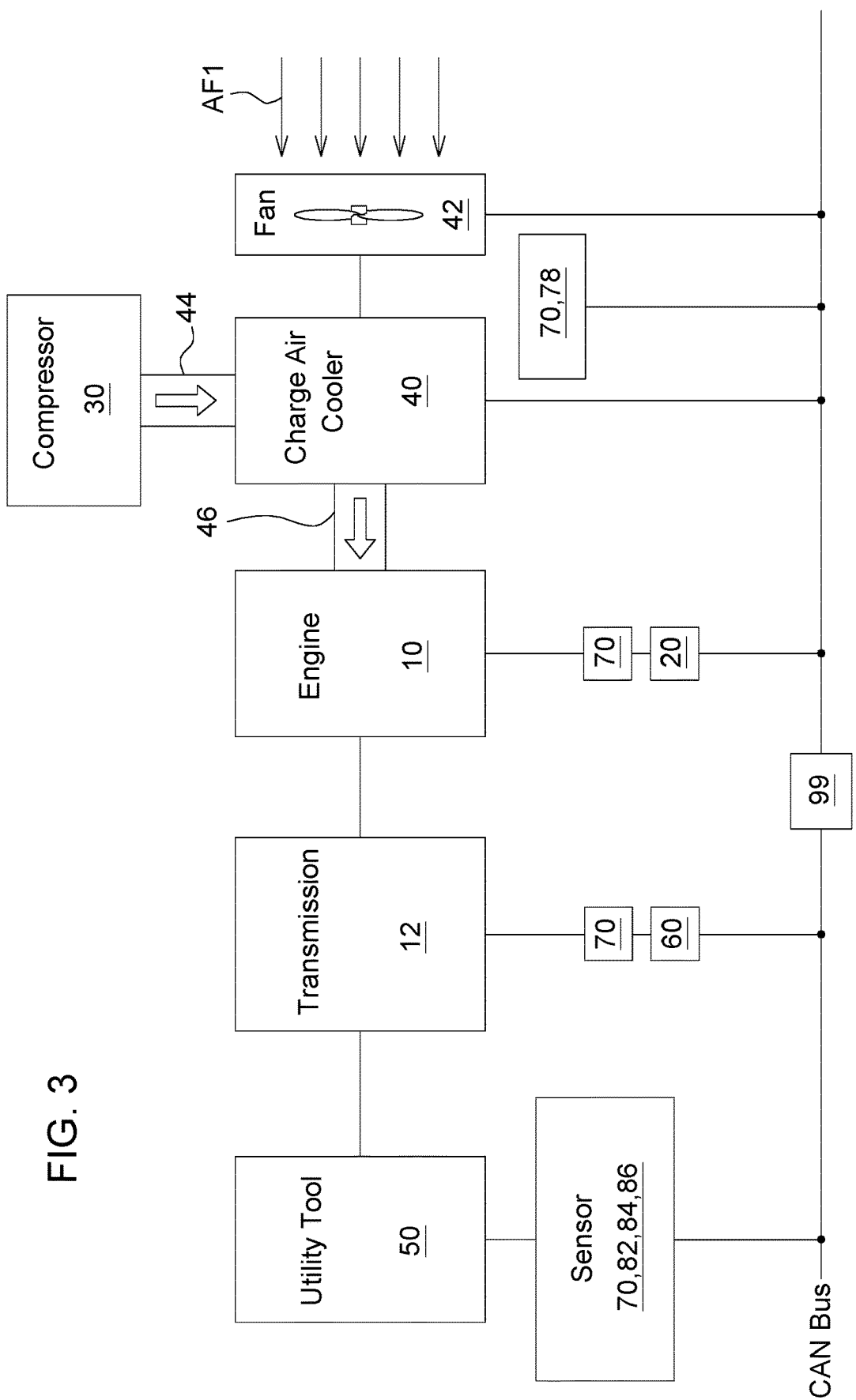

CHARGE AIR COOLER FAN CONTROL

RELATED APPLICATIONS

N/A

FIELD OF THE DISCLOSURE

The present disclosure relates generally to a charge air cooler applied on a work vehicle.

BACKGROUND OF THE DISCLOSURE

To increase an engine's efficiency in combustion and its power output, a compressor is used to compress an (engine intake) air into a combustion chamber of the engine. During the air compressing process in the compressor, the temperature of the air increases. A charge air cooler (CAC) is coupled to the compressor and to the engine; it cools the air after the air pass through the compressor but before the air enters the engine. The cooled air therefore has higher density which further improves the combustion within the engine later.

SUMMARY OF THE DISCLOSURE

According to an aspect of the present disclosure, a work vehicle includes an engine, a compressor used to compress an air toward the engine, a charge air cooler coupled to the engine and to the compressor, a sensor, and a control unit. The charge air cooler includes or is coupled to a fan. The fan is used to rotate in a first direction so as to remove a heat of the air passing through the charge air cooler and to rotate in a second direction reverse to the first direction so as to blow a debris accumulated on or adjacent to the charge air cooler. The control unit is electrically coupled to the engine and to the fan. The control unit is used to predict whether a temperature of the air exceeds a threshold based on a signal received from the sensor, and when the temperature of the air is below the threshold, the fan is allowed to rotate in the second direction and when the temperature of the air is equal to or above the threshold, the fan is inhibited from rotating in the second direction.

According to another aspect of the present disclosure, a method for controlling a fan coupled to or comprised by a charge air cooler of a work vehicle, the charge air cooler coupled to an engine and to a compressor, the compressor compressing an air toward the engine, the method comprising: cooling the charge air cooler by the fan rotating in a first direction; detecting a temperature adjacent to the charge air cooler by a sensor; determining whether the temperature adjacent to the charge air cooler exceeds a threshold based on a signal indicative of the temperature from the sensor by a control unit; allowing the fan to rotate in a second direction reverse to the first direction so as to blow a debris accumulated on or adjacent to the charge air cooler when the temperature adjacent to the charge air cooler is below the threshold; and inhibiting the fan from rotating in the second direction when the temperature adjacent to the charge air cooler is equal to or above the threshold.

According to another aspect of the present disclosure, a method for controlling a fan coupled to or comprised by a charge air cooler of a work vehicle, the charge air cooler coupled to an engine and to a compressor, the compressor compressing an air toward the engine, the method comprising: cooling the charge air cooler by the fan rotating in a first direction; detecting at least one of properties of a driveline component and an activation of a utility tool by a sensor; predicting whether the temperature of the air exceeds a threshold based on a signal from the sensor by a control unit; allowing the fan to rotate in a second direction reverse to the first direction so as to blow a debris accumulated on or adjacent to the charge air cooler when the temperature of the air is below the threshold; and inhibiting the fan from rotating in the second direction when the temperature of the air is equal to or above the threshold.

Other features and aspects will become apparent by consideration of the detailed description and accompanying drawings.

BRIEF DESCRIPTION OF THE DRAWINGS

The detailed description of the drawings refers to the accompanying figures in which:

FIG. 3 is a block diagram illustrating a second embodiment of a cooling system of a work vehicle, where control units are coupled through controller area network.

DETAILED DESCRIPTION OF THE DRAWINGS

The following description relates to the implementation of cooling fan(s) in cooling applications with a charge air cooler. Charge air coolers, like other heat exchangers on construction and agriculture equipment, often require the fan to reverse in order to blow debris out of the heat exchanger and inlet screens. However, such reverse operation may pose a risk to fan durability. First, if the fans are electric fans, they may have a lower ambient temperature limit than other traditional fan drives. In other words, the fan may be susceptible to high temperature. Second, the temperature of the charge air cooler is typically higher than that of other heat exchangers. Third, the charge air cooler temperature may increase and decrease very quickly compared to other heat exchangers. If a fan reversal is commanded when there is a high load on the engine, the fan can pull relatively hot air through the charge air cooler and over the fan that exceeds the temperature limit of the fan by a considerable amount. Multiple explanatory embodiments of cooling systems of a work vehicle are disclosed as follows.

Figure 1:
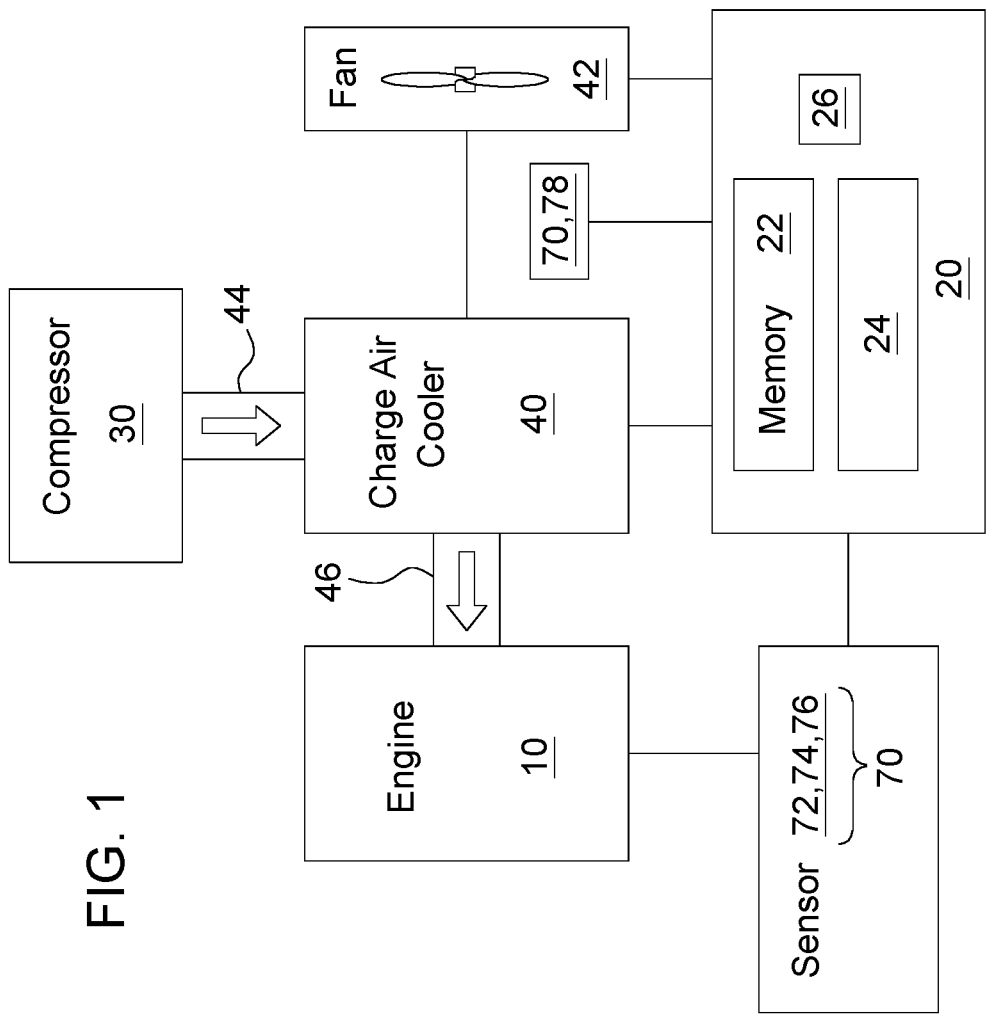
FIG. 1 is a block diagram illustrating a first embodiment of a cooling system of a work vehicle.

Referring to FIG. 1, this embodiment demonstrates a control unit coupled to an engine and at least one sensor directly without controller area network. A cooling system of a work vehicle include an engine 10, a control unit 20 electrically coupled to the engine 10 and to a compressor 30 (turbocharger), a charge air cooler 40 coupled to the engine 10 and the compressor 30, and a sensor 70. The engine 10 in this embodiment is an internal combustion engine, converting the potential energy in the fuel into the kinetic energy for machine operation. Other driveline components, such as transmission, is omitted in FIG. 1 for succinctness. The engine 10 may be applied on a hybrid or fuel work vehicle. In order to enhance the combustion efficiency and power output of the engine 10, the compressor 30 is configured to compress an air toward the engine 10.

Figure 2C:
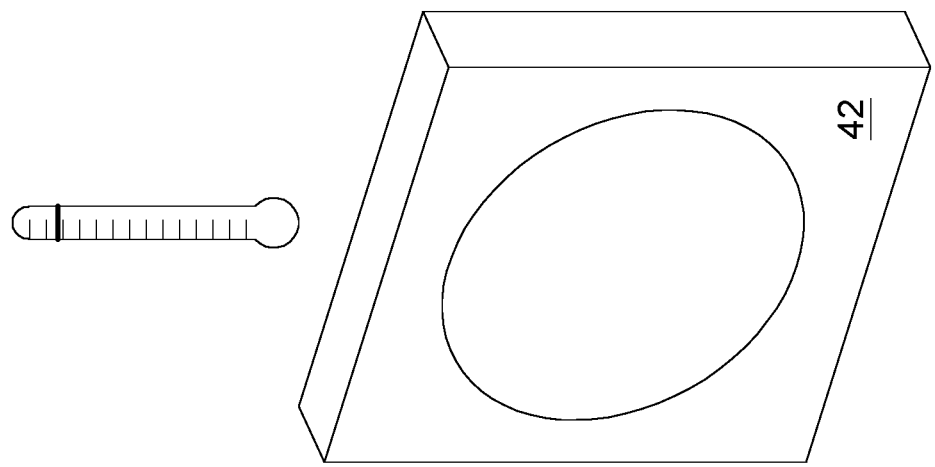
FIG. 2C illustrates the fan of the charge air cooler rotating in the second direction when the ambient temperature of the fan is high, and such reversal is inhibited to avoid the damage of the fan.

During the compressing process, the air is compressed and the temperature of the air rises. The charge air cooler 40 is used to cool the air before it enters the engine 10. A fan 42 is coupled to or included by the charge air cooler 40 so as to improve heat dissipation. The charge air cooler 40 is coupled to the compressor 30 via a first connection 44 and is coupled to the engine 10 via a second connection 46. Referring to FIG. 1 and FIG. 2A, the fan 42 is configured to rotate in a first direction so as to remove a heat of the air passing through the charge air cooler 40. In this regard, the air passing through the second connection 46 is colder and denser than that passing through the first connection 44. The cooled, dense air later from the second connection 46 enters the engine 10 for combustion.

Figure 2B:
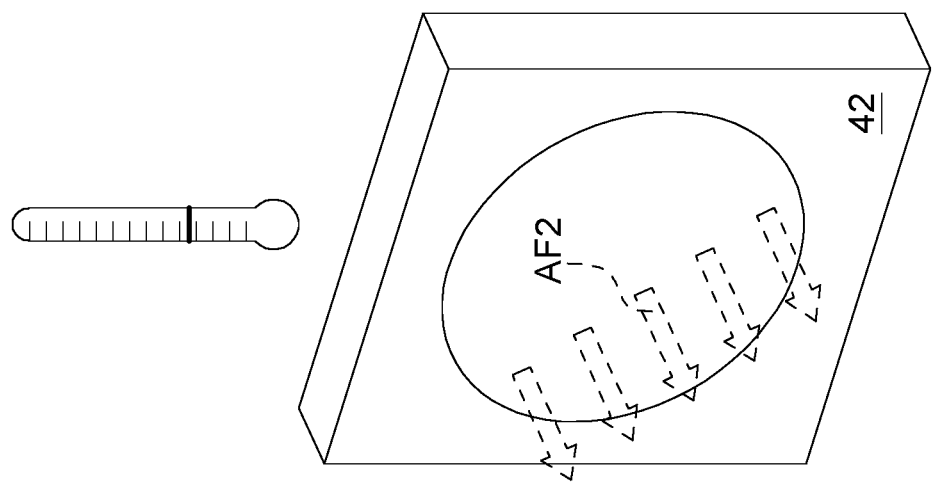
FIG. 2B illustrates the fan of the charge air cooler rotating in a second direction reverse to the first direction when the ambient temperature of the fan is low.
Figure 2A:
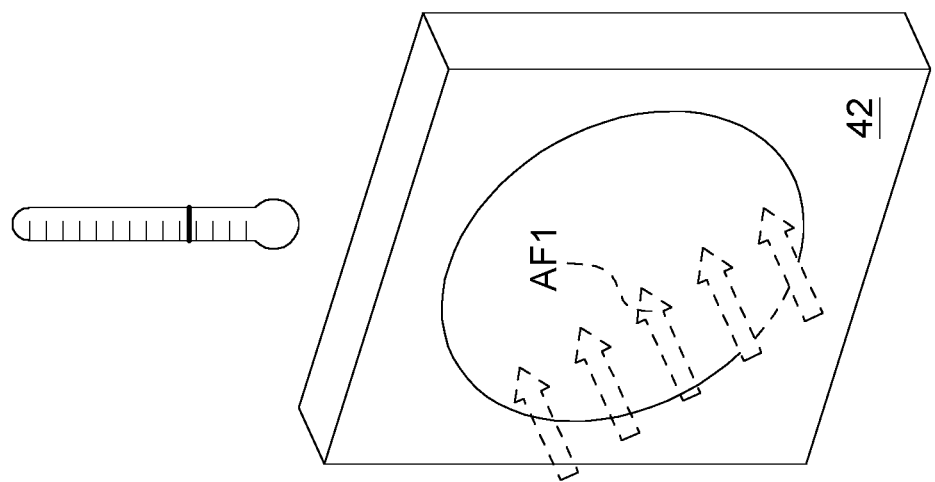
FIG. 2A illustrates a fan of a charge air cooler rotating in a first direction.

It is noted that the fan 42, as shown in FIG. 2B, is also configured to rotate in a second direction reverse to the first direction so as to blow a debris accumulated on or adjacent to the charge air cooler 40 and/or an inlet screen or grill (not shown). The fan 42 rotates in the second direction when the work vehicle operates in a reversal permissible condition, such as low engine load or low temperature of charge air cooler 40. However, on the contrary, if the fan 42 rotates in the second direction when the work vehicle operates in a reversal prohibited condition, such as high engine load or high temperature of charge air cooler 40, the hot air pulled from the charge air cooler 40 over the fan 42 may damage the fan 42. Therefore, the fan 42 is inhibited from rotating in the second direction, as shown in FIG. 2C to avoid such damage. The details in whether to permit the fan 42 to rotates in the second direction will be described later.

The control unit 20 (or multiple controllers) may be provided to control the rotation of the fan 42. In the first embodiment, the control unit 20 is an engine control unit, which, in general, controls various aspects of operation of the engine 10. The control unit 20 may be defined, in the first embodiment, as a computing device associated with microprocessors (not shown) and memory 22. The control unit 20 may receive commands from the operator control member to perform various tasks relating to engine 10. For example, the control unit 20 may determine the amount of fuel to inject for combustion by receiving a signal from a throttle position sensor (not shown). The control unit 20 is also configured to receive signal(s) from the sensor 70. In the first embodiment in which the control unit 20 is the engine control unit, the sensor 70 detects properties of the engine 10. The sensor 70 may include one or more sensors such as a temperature sensor 72 detecting the temperature of the engine 10, an engine load sensor 74 detecting a load applied to the engine 10, and an engine torque sensor 76 detecting a torque of the engine 10. The control unit 20 may also include a compressor outlet model 24, which comprises one or more processor. The compressor outlet model 24 of the control unit 20 is also configured to predict whether one or several conditions is met, based on the signal from the sensor 70, and then the control unit 20 may transmit one or more signals to control the charge air cooler 40 and the fan 42. Additionally, the control unit 20 may further include a clock (unit) 26 to count the time. The control unit 20 may check whether the one or several conditions is met when the time in some conditions is more than a pre-set time frame, so as to perform actions, such as allowing the fan 42 to rotate in the second direction or inhibiting the fan 42 from rotating in the second direction.

As mentioned earlier, the control unit 20 is configured to predict whether a temperature of the air (in the second connection 46, compressor outlet) exceeds a threshold based on a signal received from the sensor 70. One or more data may be pre-stored in the memory 22, and the control unit 20 may use the data to predict the temperature of the air (temperature of air in the second connection 46). For example, if the sensor 70 is a temperature sensor 72 measuring the temperature of the engine 10, the temperature measured by the temperature sensor 72 may be compared with the pre-stored temperature data in the memory 22 by the control unit 20 to predict whether the temperature of the air in the second connection 46 exceeds a threshold (e.g. the ambient temperature limit of the fan 42.) When the temperature measured by the temperature sensor 72 is below a pre-stored temperature, which indicates the temperature of the air is below the threshold, the fan 42 is allowed to rotate in the second direction. When temperature measured by the temperature sensor 72 is equal or above the pre-stored temperature, which indicates the temperature of the air is equal to or above the threshold, the fan 42 is inhibited from rotating in the second direction in order to protect the fan 42 or other components.

For another example, if the sensor 70 is an engine load sensor 74 measuring load of the engine 10, the load of engine 10 measured by the engine load sensor 74 may be compared with the pre-stored engine load data in the memory 22 by the control unit 20 to predict whether the temperature of the air in the second connection 46 exceeds a threshold (e.g. the ambient temperature limit of the fan 42.) When the load of engine 10 measured by the engine load sensor 74 is below a pre-stored engine load, which indicates the temperature of the air is below the threshold, the fan 42 is allowed to rotate in the second direction. When the load of engine 10 measured by the engine load sensor 74 is equal or above the pre-stored engine load, which indicates the temperature of the air is equal to or above the threshold, the fan 42 is inhibited from rotating in the second direction in order to protect the fan 42 or other components. Optionally, the control unit 20 may calculate the engine percent load by comparing the load of engine 10 measured by the engine load sensor 74 with the pre-stored engine load data. The value of the engine percent load may be used to predict whether the threshold is exceeded.

For another example, if the sensor 70 is an engine torque sensor 76 measuring torque of the engine 10, the torque of engine 10 measured by the engine torque sensor 76 may be compared with the pre-stored engine torque data in the memory 22 by the control unit 20 to predict whether the temperature of the air in the second connection 46 exceeds a threshold (e.g. the ambient temperature limit of the fan 42.) When the torque of engine 10 measured by the engine torque sensor 76 is below a pre-stored engine torque, which indicates the temperature of the air is below the threshold, the fan 42 is allowed to rotate in the second direction. When torque of the engine 10 measured by the engine torque sensor 76 is equal or above the pre-stored engine torque, which indicates the temperature of the air is equal to or above the threshold, the fan 42 is inhibited from rotating in the second direction in order to protect the fan 42 or other components. Optionally, the control unit 20 may calculate the engine percent torque by comparing the torque of engine 10 measured by the engine torque sensor 76 with the pre-stored engine torque data. The value of the engine percent torque may be used to predict whether the threshold is exceeded.

It is noted that the properties of the engine 10, such as the temperature, the load, and the torque of the engine 10 are only examples; the measurement of other types of properties may be used to predict whether the temperature of the air in the second connection 46 (compressor outlet) exceeds the threshold. In one implementation, the control unit 20 may calculate the temperature of the air in the second connection 46 based on the comparison between the measurement of the property and the pre-stored data. In another implementation, the control unit 20 may not have to directly calculate the temperature of the air; the comparison between the measurement of the property and the pre-stored data may be sufficient to predict whether the temperature of the air in the second connection 46 (compressor outlet) exceeds the threshold.

The sensor 70, as described before, may detect the property of the engine 10. In another implementation, the sensor 70 is a temperature sensor 78 as shown in FIG. 1. The temperature sensor 78 is positioned on or adjacent to the charge air cooler and configured to measure an ambient temperature around the charge air cooler 40. The control unit 20 may determine whether the temperature of the ambient temperature around the charge air cooler 40 exceeds a threshold based on a signal indicative of the ambient temperature around the charge air cooler 40 from the sensor 78. When the ambient temperature around the charge air cooler 40 is below the threshold, the control unit 20 may allow the fan 42 to rotate in a second direction reverse to the first direction so as to blow a debris accumulated on or adjacent to the charge air cooler. When the ambient temperature around the charge air cooler 40 is equal to or above the threshold, the control unit 20 may inhibit the fan 42 from rotating in the second direction.

Referring to FIG. 3, in the second embodiment, a control unit may communicate with various systems of the work vehicle via a controller area network (CAN) bus. In one implementation, the control unit may be the (engine) control unit 20 receiving signal indicative of at least one property of the engine 10 from sensor 70 (72, 74, 76, 78) to predict whether a temperature of the air exceeds a threshold as discussed previously. Alternatively, the control unit may be a (electronic) control unit 99 coupled to the sensor 70 (72, 74, 76, 78) and controlling the fan 42 to rotate in the second direction similar to the description of control unit 20 in the first embodiment.

Figure 4C:
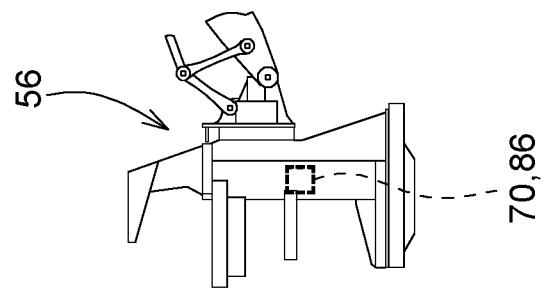
FIG. 4C illustrates a sensor detecting an engagement of a felling head.
Figure 4B:
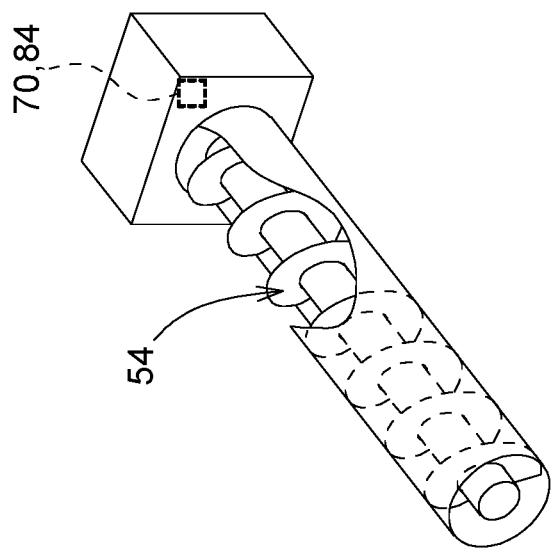
FIG. 4B illustrates a sensor detecting an activation of an auger.
Figure 4A:
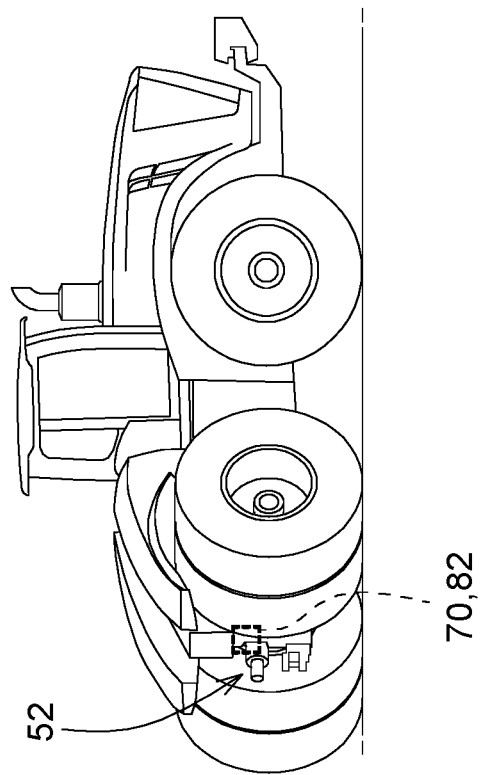
FIG. 4A illustrates a sensor detecting an engagement of a power-take-off shaft.

In another implementation, the sensor 70 may be used to detect an activation of the utility tool and the control unit may be the (engine) control unit 20 or the (electronic) control unit 99 coupled to the fan 42 to control the rotation in the second direction, based on the signal received from the sensor 70 via the controller area network. The activation of the utility may indicate that the load of the engine 10 will increase and the temperature of the air will increase, and therefore the fan 42 is inhibited from rotating in the second direction. The work vehicle can be a tractor, crop harvester, and feller buncher, etc. As shown in FIGS. 3 and 4A, the work vehicle is a tractor. The activation of the utility tool includes an engagement of a power take-off shaft 52. The implement, such as a seeding or tillage equipment, engaged with the power take-off shaft 52 is detected by the sensor 70, 82 which may be a proximity sensor. As shown in FIGS. 3 and 4B, the work vehicle is a crop harvester and the activation of the utility tool includes an activation of an auger 54, which is detected by the sensor 70, 84. As shown in FIGS. 3 and 4C, the work vehicle is a feller buncher and the activation of the utility tool includes an engagement of felling head 56, which is detected by the sensor 70, 86.

In another implementation, similar to the at least one of the properties of the engine 10 is detected/measured by the sensor, at least one the properties of the transmission 12 can be detected/measured by sensor(s) so as to control the fan 42. The control unit may be the (transmission) control unit 60 receiving signal indicative of at least one property of the transmission 12, such as transmission load, transmission torque, or temperature from a sensor 70. The signal received by the control unit 60 may be compared with a pre-stored data stored in a memory (not shown) of the control unit 60 so as predict whether a temperature of the air exceeds a threshold. It is noted that the control unit 60 may directly control the fan or transmit a signal indicative of the comparison outcome to other control unit(s) such as control unit 20 or control unit 99 to control the rotation direction of the fan 42.

Figure 5:
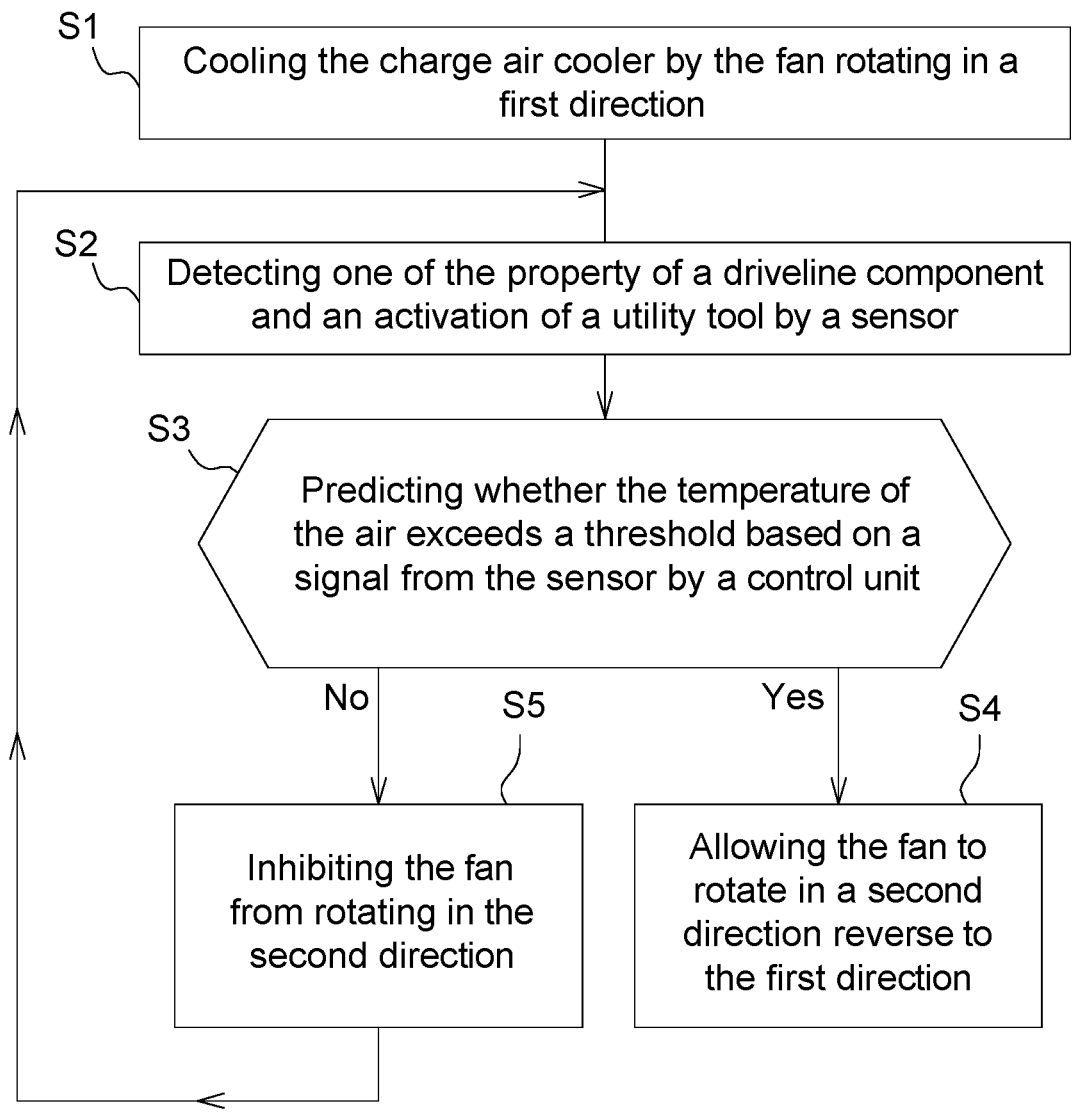
FIG. 5 illustrates a method for controlling a fan coupled to or comprised by a charge air cooler of a work vehicle.

The present disclosure, as shown in FIG. 5 also includes a method for controlling a fan coupled to or comprised by a charge air cooler of a work vehicle. The charge air cooler is coupled to an engine and to a compressor. The compressor compresses an air toward the engine. The method comprising:

S1: cooling the charge air cooler by the fan rotating in a first direction.

S2: detecting at least one of properties of a driveline component and an activation of a utility tool by a sensor. The driveline component can be an engine, transmission, etc., and the properties include temperature, torque, load of the driveline component. The utility tool may include an auger, a power-take-off shaft, or a felling head, etc.

S3: predicting whether the temperature of the air exceeds a threshold based on a signal from the sensor by a control unit. The control unit, as described previously, can be an engine control unit, a transmission control unit, an electronic control unit or the combination.

S4: allowing the fan to rotate in a second direction reverse to the first direction so as to blow a debris accumulated on or adjacent to the charge air cooler when the temperature of the air is below a threshold.

S5: inhibiting the fan from rotating in the second direction when the temperature of the air is equal to or above the threshold. In one implementation, the control unit of the work vehicle would inhibit the fan from rotating in the second direction until such time that the temperature of the air has fallen below the threshold (the ambient temperature limit) for a certain duration, which is counted by a clock coupled to or included by the control unit. In another implementation, the control unit of work vehicle would inhibit the fan from rotating in the second direction until such time that the temperature of the air has fallen below the threshold (the ambient temperature limit) by a certain number of degrees which is predicted by the controller unit.

It is noted that predicting whether the temperature of the air in the compressor outlet exceeding a threshold is only an example. Whether the temperature of other element such as charge air cooler, which relates to the temperature of the air, exceeding a threshold can also be predicted by different algorithm and pre-stored data in the control unit so as to determine whether to inhibit the fan from rotating in the second direction.

In another embodiment, a method for controlling a fan is coupled to or comprised by a charge air cooler of a work vehicle, the charge air cooler coupled to an engine and to a compressor. The compressor compressing an air toward the engine, the method comprising:

M1: cooling the charge air cooler by the fan rotating in a first direction.

M2: detecting a temperature adjacent to the charge air cooler by a sensor.

M3: determining whether the temperature adjacent to the charge air cooler exceeds a threshold based on a signal indicative of the temperature from the sensor by a control unit.

M4: allowing the fan to rotate in a second direction reverse to the first direction so as to blow a debris accumulated on or adjacent to the charge air cooler when the temperature adjacent to the charge air cooler is below a threshold.

M5: inhibiting the fan from rotating in the second direction when the temperature adjacent to the charge air cooler is equal to or above the threshold.

Without in any way limiting the scope, interpretation, or application of the claims appearing below, a technical effect of one or more of the example embodiments disclosed herein is to prevent the fan damaged by the heat from compressor.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A work vehicle, comprising:
an engine;
a compressor configured to compress an air toward the engine;
a charge air cooler coupled to the engine and to the compressor, the charge air cooler comprising or coupled to a fan, the fan configured to rotate in a first direction so as to remove a heat of the air passing through the charge air cooler and configured to rotate in a second direction reverse to the first direction so as to blow a debris accumulated on or adjacent to the charge air cooler;
a sensor configured to detect an activation of a utility tool to transmit a signal; and
a control unit electrically coupled to the engine and to the fan, the control unit configured to predict whether a temperature of the air exceeds a threshold based on the signal received from the sensor, and when the temperature of the air is below the threshold, the fan is allowed to rotate in the second direction and when the temperature of the air is equal to or above the threshold, the fan is inhibited from rotating in the second direction.

2. The work vehicle of claim 1, wherein the control unit includes at least one of an electronic control unit, an engine control unit, and a transmission control unit.

3. The work vehicle of claim 1, wherein when the work vehicle is a crop harvester, the activation of the utility tool includes an activation of an auger.

4. The work vehicle of claim 1, wherein when the work vehicle is a feller buncher, the activation of the utility tool includes an engagement of felling head.

5. The work vehicle of claim 1, wherein when the work vehicle is a tractor, the activation of the utility tool includes an engagement of a power take-off shaft.

6. The work vehicle of claim 1, wherein the control unit is coupled to the sensor via a controller area network.

7. A method for controlling a fan coupled to or comprised by a charge air cooler of a work vehicle, the charge air cooler coupled to an engine and to a compressor, the compressor compressing an air toward the engine, the method comprising:
cooling the charge air cooler by the fan rotating in a first direction;
detecting an activation of a utility tool by a sensor;
predicting whether a temperature of the air exceeds a threshold based on a signal from the sensor by a control unit;
allowing the fan to rotate in a second direction reverse to the first direction so as to blow a debris accumulated on or adjacent to the charge air cooler when the temperature of the air is below the threshold; and
inhibiting the fan from rotating in the second direction when the temperature of the air is equal to or above the threshold.

8. The method of claim 7, wherein when the work vehicle is a crop harvester, the activation of the utility tool includes an activation of an auger.

9. The method of claim 7, wherein when the work vehicle is a feller buncher, the activation of the utility tool includes an engagement of felling head.

10. The method of 12, wherein when the work vehicle is a tractor, the activation of the utility tool includes an engagement of a power take-off shaft.

11. The method of claim 7, wherein the signal from the sensor is received by the control unit via controller area network.

12. A method for controlling a fan coupled to or comprised by a charge air cooler of a work vehicle, the charge air cooler coupled to an engine and to a compressor, the compressor compressing an air toward the engine, the method comprising:
cooling the charge air cooler by the fan rotating in a first direction;
detecting at least one of properties of a driveline component and an activation of a utility tool by a sensor;
predicting whether a temperature of the air exceeds a threshold based on a signal from the sensor by a control unit;
allowing the fan to rotate in a second direction reverse to the first direction so as to blow a debris accumulated on or adjacent to the charge air cooler when the temperature of the air is below the threshold; and
inhibiting the fan from rotating in the second direction when the temperature of the air is equal to or above the threshold; wherein inhibiting the fan from rotating in the second direction is performed when a time of the temperature of the air below the threshold shorter than a pre-set time frame.

* * * * *